United States Patent Office 2,739,171
Patented Mar. 20, 1956

2,739,171

PRODUCTION OF DIHYDROXY DIARYL ETHERS

Carl B. Linn, Riverside, Ill., assignor to Universal Oil Products Company, Chicago, Ill., a corporation of Delaware No Drawing. Application May 2, 1951,
Serial No. 224,251

7 Claims. (Cl. 260—613)

This invention relates to a process for producing dihydroxy diaryl ethers and more particularly to the production of a dihydroxy diphenyl ether.

An object of this invention is to produce a dihydroxy diaryl ether.

Another object of this invention is to produce a dihydroxy diphenyl ether.

A further object of this invention is to produce 4,4'-dihydroxy diphenyl ether.

One embodiment of this invention relates to a process for preparing a dihydroxy diaryl ether which comprises reacting a dihydroxy aromatic compound in the presence of a dehydrating agent.

Another embodiment of this invention relates to a process for preparing a dihydroxy diaryl ether which comprises reacting a dihydroxy aromatic compound in the presence of an acid-acting dehydrating catalyst.

A further embodiment of this invention relates to a process for preparing 4,4'-dihydroxy diphenyl ether which comprises reacting hydroquinone in the presence of an acid-acting dehydrating catalyst.

A still further embodiment of this invention relates to a process for preparing 4,4'-dihydroxy diphenyl ether which comprises reacting hydroquinone in the presence of hydrofluoric acid.

An additional embodiment of this invention relates to a process for preparing 4,4'-dihydroxy diphenyl ether which comprises reacting hydroquinone in the presence of hydrofluoric acid containing from about 95 to about 100% by weight of HF at a temperature of from about 30° to about 150° C.

Dihydroxy aromatic compounds which are utilizable as starting materials in this process include dihydric phenols and other related compounds comprising essentially an aromatic hydrocarbon nucleus combined with 2 hydroxyl groups. The dihydroxy aromatic compounds preferred for this process are dihydric phenols in which a benzene ring is combined with 2 hydroxyl groups. Such dihydric phenols include hydroquinone, resorcinol, catechol, and also orcinol which may also be referred to as symmetrical dihydroxy toluene as well as other dihydroxy benzene compounds in which an alkyl group is also combined with the benzene ring. Other dihydroxy aromatic compounds may contain a naphthalene ring or other polycyclic aromatic hydrocarbon ring combined with 2 hydroxyl groups.

Dehydrating agents which are utilizable in this process are acid-acting compounds and include hydrofluoric acid, phosphoric acid, composites and calcined composites of phosphoric acid and a siliceous carrier and also acid-acting oxides or oxide mixtures such as alumina, silica-alumina, silica-alumina-zirconia, magnesia-silica and the like. A catalyst having high utility in this process is hydrofluoric acid which is employed as a solution containing from about 90 to about 100% by weight of hydrogen fluoride and from about 10 to about 0% by weight of water and preferably hydrofluoric acid of from about 95 to about 100% HF concentration.

This process for producing dihydroxy diaryl ethers is carried out generally at a temperature of from about 30° to about 150° C. and at a pressure sufficient to keep the reactants and dehydrating agent in substantially liquid phase. Thus a dihydric phenol such as hydroquinone is contacted with strong hydrofluoric acid in either a batch type reactor or in a continuous treating apparatus in which the dihydroxy aromatic compound is contacted with the dehydrating agent at a temperature sufficient to effect partial dehydration of the charged dihydroxy aromatic compound and condensation thereof to form a dihydroxy diaryl ether. Thus hydroquinone is reacted in the presence of strong hydrofluoric acid such as substantially anhydrous hydrogen fluoride at a temperature of from about 30° to about 150° C. for a time sufficient to effect conversion of a substantial proportion of the charging stock into a dihydroxy diaryl ether which may be referred to more particularly as 4,4'-dihydroxy diphenyl ether.

The dihydroxy diaryl ethers formed in this process are useful as starting materials for the synthesis of more complex organic compounds utilizable as inhibitors to prevent oxidative deterioration of hydrocarbon oils, fats, and the like or the resultant dihydroxy diaryl ethers such as 4,4'-dihydroxy diphenyl ether may be utilized as an oxidation inhibitor in gasoline, lard and other edible fats and oils to prevent oxidative deterioration therein. Also 4,4'-dihydroxy diphenyl ether may be alkylated with tertiary butyl alcohol, isobutylene, di-isobutylene and other isobutylene polymers to form a butylated dihydroxy diphenyl ether having improved activity as an oxidation inhibitor. The tertiary butyl derivative or derivatives of 4,4'-dihydroxy diphenyl ether may also be formed by utilizing tertiary butyl hydroquinone and other tertiary butylated dihydric phenols as starting materials in this process.

The nature of this invention is illustrated further by the following example which is given with no intention of limiting unduly the generally broad scope of the invention.

A copper lined autoclave of 850 cc. capacity was charged with 110 grams of hydroquinone and 200 grams of substantially anhydrous hydrogen fluoride, the autoclave was then rotated and heated at a temperature of 75° C. for a time of 12 hours after which the autoclave was permitted to cool and the reaction products were then removed from the autoclave and investigated. It was found that about 30% by weight of the hydroquinone charged to the process was converted and of this 30%, about 47% was transformed into 4,4'-dihydroxy diphenyl ether which is also referred to as 4,4'-dihydroxy diphenyl oxide.

The inhibitor potency of 4,4'-dihydroxy diphenyl oxide was tested in a cracked gasoline which had a blank induction period of 60 minutes. It was found that the addition of 0.005% by weight of dihydroxy diphenyl oxide to the gasoline increased the induction period to 150 minutes.

The inhibitor potency of 4,4'-dihydroxy diphenyl oxide was also tested in a sample of lard which developed rancidity in four hours as measured by the active oxygen method. In the presence of 0.01% by weight of 4,4'-dihydroxy diphenyl oxide, the development of rancidity was delayed for 17 hours.

Alkylation of the 4,4'-dihydroxy diphenyl oxide with tertiary butyl alcohol in the presence of phosphoric acid produces a more potent antioxidant especially for delaying the development of rancidity in lard.

I claim as my invention:

1. A process for producing a dihydroxy diaryl ether which comprises subjecting a dihydroxy aromatic compound, as the sole reactant in the process, to the action of a dehydrating catalyst at a temperature of from about 30° to about 150° C., said catalyst comprising an acid-acting compound selected from the group consisting of hydrofluoric acid, phosphoric acid, alumina, silica, zirconia and magnesia.

2. The process of claim 1 further characterized in that said catalyst comprises hydrofluoric acid.

3. A process for preparing 4,4'-dihydroxy diphenyl ether which comprises subjecting hydroquinone, as the sole reactant in the process, to the action of a dehydrating catalyst at a temperature of from about 30° to about 150° C., said catalyst comprising an acid-acting compound selected from the group consisting of hydrofluoric acid, phosphoric acid, alumina, silica, zirconia and magnesia.

4. A process for preparing 4,4'-dihydroxy diphenyl ether which comprises reacting hydroquinone in the presence of hydrofluoric acid at a temperature of from about 30° to about 150° C.

5. A process for preparing 4,4'-dihydroxy diphenyl ether which comprises reacting hydroquinone in the presence of phosphoric acid at a temperature of from about 30° to about 150° C.

6. A process for preparing 4,4'-dihydroxy diphenyl ether which comprises reacting hydroquinone in the presence of a calcined composite of a phosphoric acid and a carrier at a temperature of from about 30° to about 150° C.

7. A process for preparing 4,4'-dihydroxy diphenyl ether which comprises reacting hydroquinone in the presence of hydrofluoric acid containing from about 90 to about 100% by weight of HF at a temperature of from about 30° to about 150° C.

References Cited in the file of this patent

UNITED STATES PATENTS

| | | |
|---|---|---|
| 2,204,339 | Bowles | June 11, 1940 |
| 2,264,371 | Harvey | Dec. 2, 1941 |
| 2,337,924 | Platz et al. | Dec. 28, 1943 |
| 2,487,832 | Searle | Nov. 15, 1949 |
| 2,603,662 | Stevens | July 15, 1952 |

OTHER REFERENCES

Suter: "The Organic Chemistry of Sulfur," pg. 244 (1 pg. only). Pub. by John Wiley & Sons, Inc., London (1949).